Patented Dec. 9, 1952

2,621,213

UNITED STATES PATENT OFFICE 2,621,213

PRETREATMENT OF ARALKYL HYDROCARBONS WITH ALKALI METAL HYDROXIDE

George G. Joris, Convent, N. J., assignor to Allied Chemical & Dye Corporation, New York, N. Y., a corporation of New York No Drawing. Application July 19, 1949,
Serial No. 105,647

3 Claims. (Cl. 260—610)

This invention relates to liquid phase oxidation of aralkyl hydrocarbons by elemental oxygen, particularly by oxygen of air, to produce corresponding hydroperoxides as major product.

Examples of aralkyl hydrocarbons to which the invention applies are ethylbenzene, isopropylbenzene (i. e. cumene), meta- and para-methyl isopropyl benzene (i. e. meta- and para-cymene), meta- and para-diisopropylbenzene; isopropyl- and methyl isopropyldiphenyls; isopropyl- and methyl isopropylnaphthalenes; etc. In the description of the invention which follows, oxidation of cumene to cumene hydroperoxide is specifically referred to; but the invention is not limited thereto and applies also to formation of hydroperoxides of other aralkyl hydrocarbons such as those named above.

Oxidations of cumene by air, or elemental oxygen in other form, under temperature and other conditions suitable for production of cumene hydroperoxide as major product are subject to induction periods of duration varying from one sample to the next, and often amounting to many hours during which no reaction occurs, or reaction is extremely slow, although the necessary conditions for oxidation to cumene hydroperoxide are maintained. These observed irregularities in the lengths of the induction periods indicate the induction periods may be due to traces of impurities occurring in cumene samples.

It is a principal object of the present invention to provide a pretreatment of aralkyl hydrocarbons, preliminary to oxidation thereof to the corresponding hydroperoxides, which will eliminate or greatly reduce the duration of induction periods preceding said oxidation.

Other objects and advantages will appear hereinafter.

In accordance with my invention, I contact with aqueous alkali metal hydroxide solution aralkyl hydrocarbon which is to be oxidized in liquid phase by elemental oxygen to hydroperoxide as major product, and then separate said hydrocarbon from said metal hydroxide solution preliminary to oxidation of the hydrocarbon to hydroperoxide.

My pretreatment is carried out, for example, by intermixing cumene and aqueous sodium hydroxide solution, allowing the mixture to separate into an organic layer and an aqueous layer, and separating the layers; by passing cumene in dispersed form upward through a column of aqueous sodium hydroxide solution and withdrawing the cumene from above the aqueous sodium hydroxide; or in other ways of washing with aqueous alkali which will be apparent to one skilled in the art. Intimate contact of the cumene with the sodium hydroxide solution should be effected, but prolonged contact of the two liquids is unnecessary. Room temperatures are suitable for the treatment and separation of treated hydrocarbon.

Sodium hydroxide solutions containing as low as 4% of NaOH (S. G. 1.0428) and very concentrated solutions, even wetted pellets, work equally well. Ordinarily, sodium hydroxide solutions of specific gravity between about 1.04 and 1.2 are used.

Separation of the cumene from the aqueous sodium hydroxide solution used for pretreatment is necessary to obtain the advantages of my invention since said aqueous solution, if present during oxidation of cumene, itself exerts inhibitory and/or decomposing action interfering with formation of high yields of cumene hydroperoxide.

The following example is illustrative of my invention but is not to be interpreted in a limiting sense.

*Example.*—Commercial cumene was intermixed at room temperature with an equal volume of 1 N sodium hydroxide solution (specific gravity about 1.04). The table gives comparisons between air oxidation characteristics with and without pretreatment.

Table

| Cumene | Oxidation Temp., °C | Additive | Percentage of cumene hydroperoxide after given time (hours) | | | | | |
|---|---|---|---|---|---|---|---|---|
| | | | 20 | 40 | 60 | 90 | 120 | 150 |
| Treated | 75 | $NaHCO_3$ (22.5 g./100 cc.) | 10 | 27 | ---- | 27 | ---- | ---- |
| Untreated | 75 | ----do---- | 0 | 4 | 11.5 | 27 | ---- | ---- |
| Treated | 75 | $Na_2CO_3$ (4 g./100 cc.) | 5.5 | 9.5 | 16 | 26 | ---- | ---- |
| Untreated | 75 | ----do---- | 0.25 | 0.5 | 0.75 | 3.75 | 7.5 | 11.3 |
| Treated | 130 | None | 0.65 | 1.8 | 3.35 | ---- | ---- | ---- |
| Untreated | 130 | ----do---- | 0.25 | 0.6 | 1.1 | ---- | ---- | ---- |

The use of the additives of the above oxidations is disclosed and claimed in my copending applications Serial No. 105,648, filed simultaneously herewith, now Patent 2,577,768, and Serial No. 105,649, filed simultaneously herewith, now abandoned.

Potassium hydroxide, substituted for sodium hydroxide in the procedure of the above example, gave like results.

Results of the same general nature were obtained in oxidation of alkali-treated para-cymene; oxidation of alkali-treated mixed cymene isomers (mostly meta- and para-); oxidation of alkali-treated mixed diisopropylbenzene isomers (mostly meta- and para-).

The process of my invention is particularly applicable to commercial grade aralkyl hydrocarbons, i. e. hydrocarbons which have been purified by distillation but which still contain variable amounts of impurities. It appears that certain of the impurities, deleterious to oxidation to hydroperoxide, are removed by virtue of their reactivity with alkali metal hydroxides.

I claim:

1. A process for accelerating oxidation of commercial grade, distilled aralkyl hydrocarbon in liquid phase by elemental oxygen to hydroperoxide as major product which comprises contacting said hydrocarbon with aqueous alkali metal hydroxide solution and separating said hydrocarbon from said alkali metal hydroxide solution and thereafter oxidizing at least a substantial proportion of the hydrocarbon in presence of oxygen-containing gas to hydroperoxide.

2. Process as defined in claim 1, wherein an isopropyl-substituted aromatic hydrocarbon is passed in finely dispersed form through aqueous sodium hydroxide solution of about 1.04 to 1.2 specific gravity, and hydrocarbon thus washed is separated from said aqueous sodium hydroxide and thereafter subjected to oxidation.

3. A process which comprises washing commercial grade, distilled cumene containing impurities reactive with alkali metal hydroxide with an aqueous solution of such hydroxide, separating the cumene from said solution, and thereafter oxidizing at least a substantial proportion of the cumene in the presence of oxygen-containing gas to cumene hydroperoxide.

GEORGE G. JORIS.

REFERENCES CITED

The following references are of record in the file of this patent:

UNITED STATES PATENTS

| Number | Name | Date |
|---|---|---|
| 2,430,864 | Farkas et al. | Nov. 18, 1947 |
| 2,447,794 | Brewer | Aug. 24, 1948 |
| 2,497,349 | Farkas et al. | Feb. 14, 1950 |
| 2,522,016 | Denison et al. | Sept. 12, 1950 |

FOREIGN PATENTS

| Number | Country | Date |
|---|---|---|
| 610,293 | Great Britain | Oct. 18, 1948 |

OTHER REFERENCES

Wunderly et al.: J. A. C. S., vol. 58, pp. 1007–1009 (June 1936).

Newton: J. A. C. S., vol. 65, pp. 320–323 (March 1943).